(12) United States Patent
Nakai

(10) Patent No.: US 7,991,142 B2
(45) Date of Patent: Aug. 2, 2011

(54) TELEPHONE EXCHANGE APPARATUS AND TELEPHONE SYSTEM

(75) Inventor: Hideaki Nakai, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 806 days.

(21) Appl. No.: 12/050,587

(22) Filed: Mar. 18, 2008

(65) Prior Publication Data

US 2008/0240408 A1    Oct. 2, 2008

(30) Foreign Application Priority Data

Mar. 29, 2007   (JP) ................. 2007-087860

(51) Int. Cl.
*H04M 7/00* (2006.01)

(52) U.S. Cl. ............ 379/219; 379/220.01; 379/221.01; 379/272; 379/221.14; 370/351; 370/352; 370/353; 370/354; 370/355

(58) Field of Classification Search .......... 379/220.01, 379/221.01, 272, 221.14; 370/352–356, 370/230
See application file for complete search history.

(56) References Cited

U.S. PATENT DOCUMENTS

| | | | | |
|---|---|---|---|---|
| 5,283,817 | A * | 2/1994 | Hara et al. .................. | 455/463 |
| 7,046,680 | B1 * | 5/2006 | McDysan et al. ............. | 370/396 |
| 7,916,843 | B2 * | 3/2011 | Cannata et al. ............. | 379/93.01 |
| 2005/0182672 | A1 * | 8/2005 | Hemm et al. ................. | 705/9 |
| 2006/0233176 | A1 * | 10/2006 | Stumer ...................... | 370/395.2 |
| 2007/0058639 | A1 * | 3/2007 | Khan ........................ | 370/395.52 |
| 2008/0013534 | A1 * | 1/2008 | Tsuzuki et al. ............. | 370/389 |
| 2008/0212482 | A1 * | 9/2008 | Nakayma et al. ............ | 370/237 |
| 2008/0239964 | A1 * | 10/2008 | Mitsutake ................... | 370/237 |
| 2009/0034536 | A1 * | 2/2009 | Morand et al. .............. | 370/400 |

FOREIGN PATENT DOCUMENTS

| | | |
|---|---|---|
| JP | 2000-184411 | 6/2000 |
| JP | 2003-209621 | 7/2003 |
| JP | 2004-336144 | 11/2004 |
| JP | 2005-045299 | 2/2005 |

OTHER PUBLICATIONS

Japanese Office Action dated Sep. 8, 2009 for Appln. No. 2007-087860.

* cited by examiner

*Primary Examiner* — Curtis Kuntz
*Assistant Examiner* — Joseph J Nguyen
(74) *Attorney, Agent, or Firm* — Pillsbury Winthrop Shaw Pittman, LLP

(57) ABSTRACT

According to one embodiment, a telephone exchange apparatus includes a plurality of processors whose connect communication lines differing in communication protocol from one another, a memory which stores a plurality of items of protocol unique information to process communication signals corresponding to the plurality of processors, a communication controller which is connected to the plurality of processors via control buses with smaller transmission capacities than those of the plurality of communication lines and reads the corresponding-protocol unique information from the memory based on notified protocol identification information and makes the corresponding processor execute signal processing by the protocol unique information, and a call controller which notifies protocol identification information corresponding to a communication line to be added to the communication controller, when a setting request for a call is issued.

5 Claims, 8 Drawing Sheets

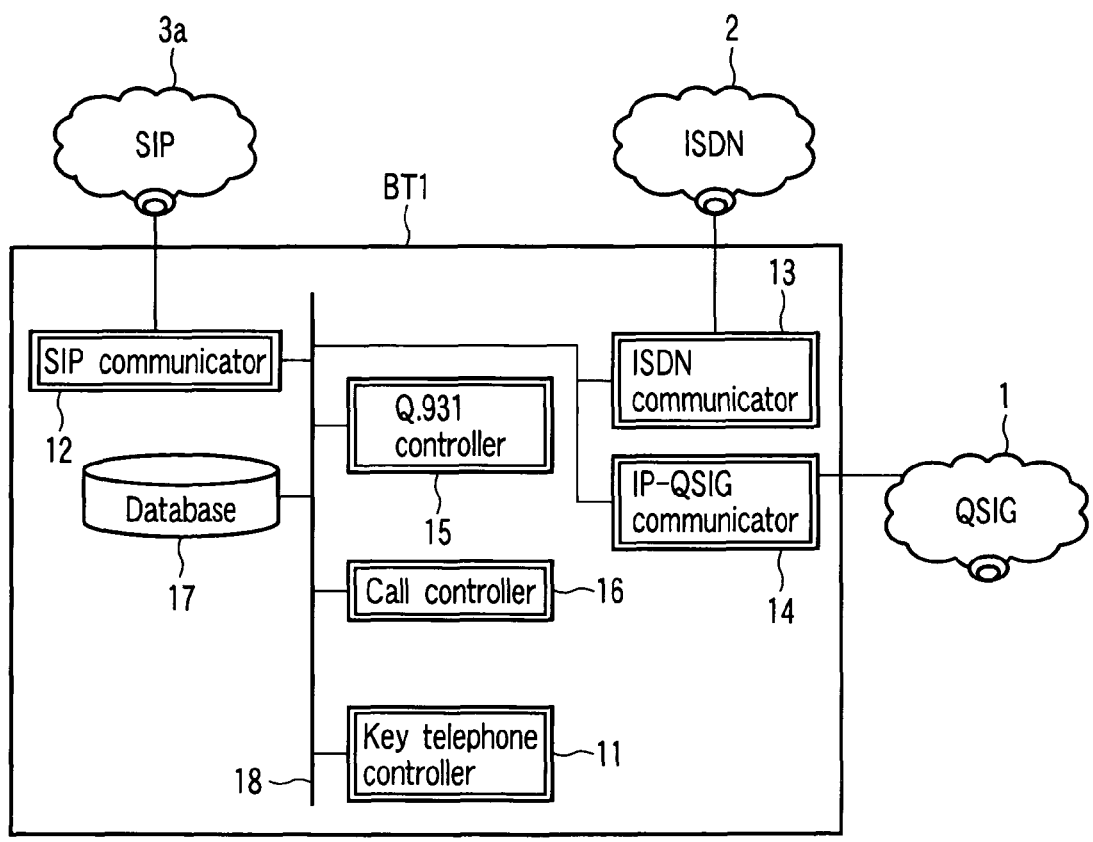
F I G. 2

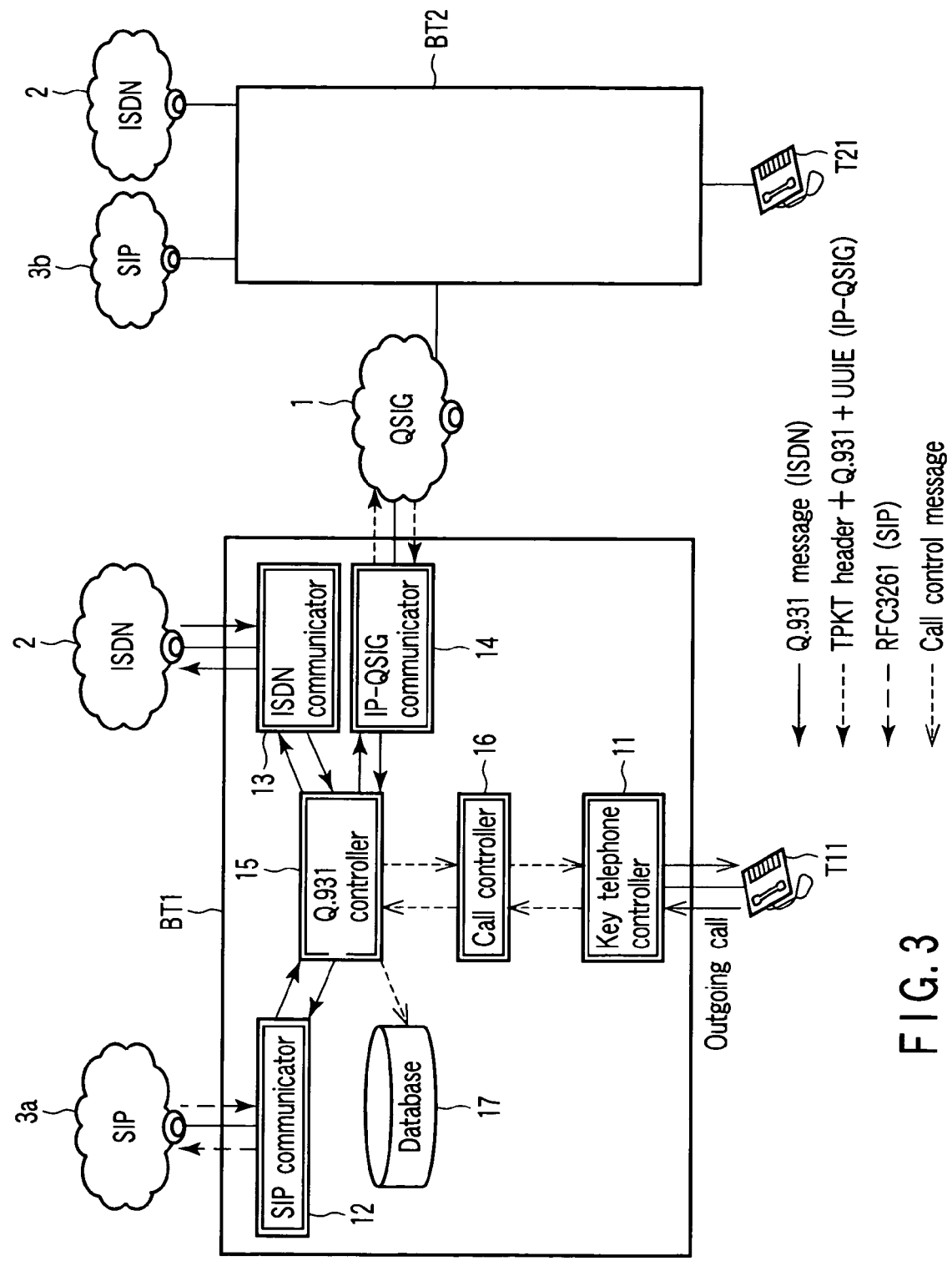
F I G. 3

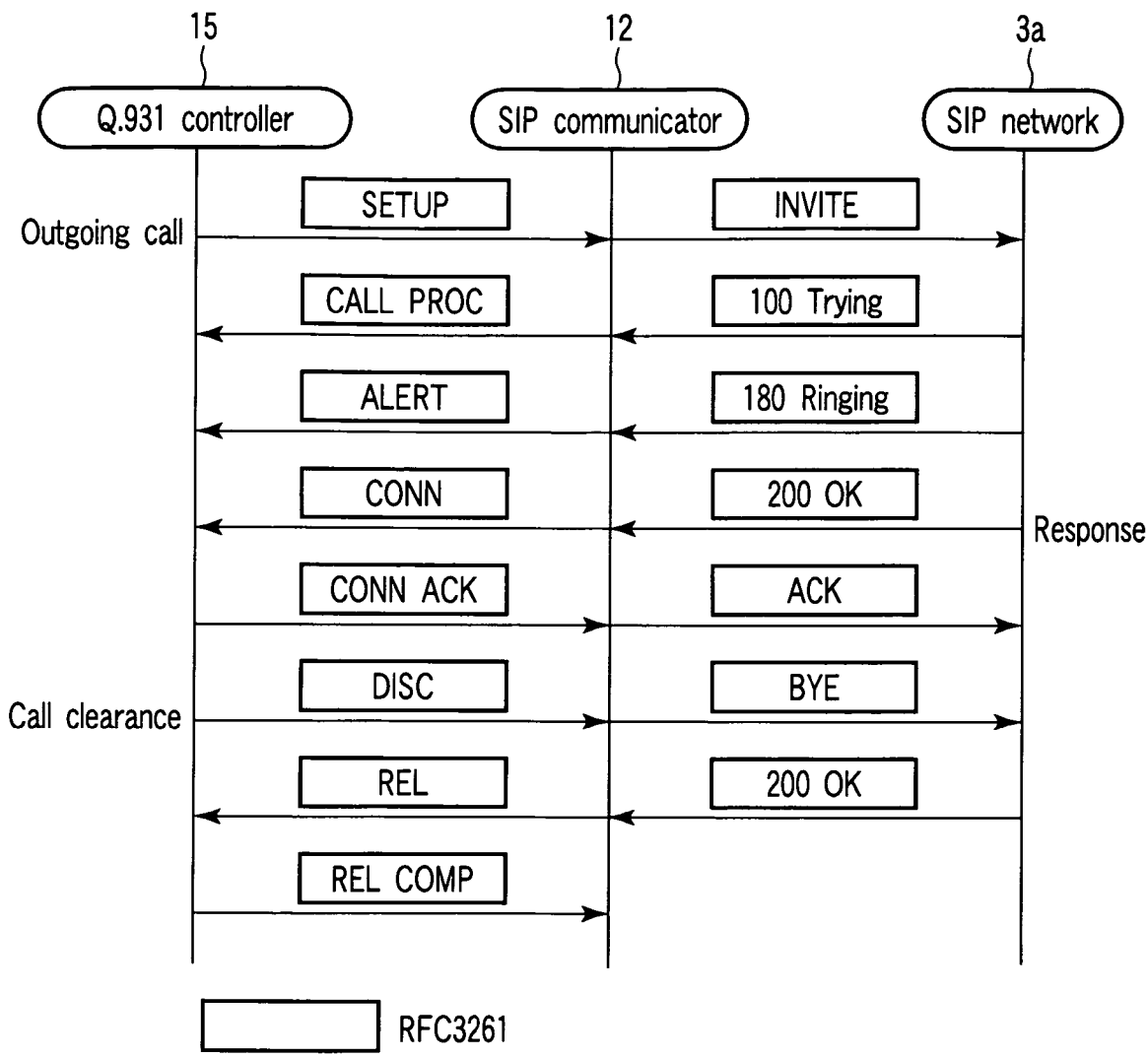
F I G. 6

TELEPHONE EXCHANGE APPARATUS AND TELEPHONE SYSTEM

CROSS-REFERENCE TO RELATED APPLICATIONS

This application is based upon and claims the benefit of priority from Japanese Patent Application No. 2007-087860, filed Mar. 29, 2007, the entire contents of which are incorporated herein by reference.

BACKGROUND

1. Field

One embodiment of the present invention relates to a telephone exchange apparatus configured to treat communication networks such as an Internet Protocol-Q-Signaling (IP-QSIG) network, a session initiation protocol (SIP) network and integrated services digital network (ISDN) which are different in communication protocol one another, and relates to a telephone system in which a plurality of telephone exchanges are connected, for example, via the IP-QSIG network one another.

2. Description of the Related Art

In recent years, an Internet Protocol (IP) telephone system which interactively transmits and receives images and audio as packet data in real time via an IP network has become widely used. The IP telephone system may perform extension communication and external line outgoing and incoming call among main apparatuses to be connected to the IP network as well as for each main apparatus though the IP network.

Meanwhile, the IP telephone system has become treat packet data of various communication protocols in the main apparatuses. In this case, each main apparatus is provided with an exclusive interface unit corresponding to various communication protocols and an exclusive communication controller for controlling the interface unit (e.g., Jpn. Pat. Appln. KOKAI Publication No. 2004-336144).

However, since each main apparatus needs an exclusive interface unit and an exclusive communication controller, adding a communication line with a new communication protocol requires additional setting of its exclusive interface unit and its exclusive communication controller, thus the configuration of each main apparatus becomes large in size and high in cost.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a functional block diagram of a main apparatus illustrated in FIG. 1;

FIG. 3 is a sequence view illustrating communication operations among an IP-QSIG network, an ISDN and an SIP network corresponding to outgoing call operations from key telephone sets;

FIG. 6 is a sequence view illustrating communication operations among the Q.931 controller, an SIP communicator and the SIP network in making an outgoing call to the SIP network;

DETAILED DESCRIPTION

Various embodiments according to the invention will be described hereinafter with reference to the accompanying drawings. In general, according to one embodiment of the invention, a telephone exchange apparatus comprising: a plurality of processors which connect communication lines differing in communication protocol from one another; a memory which stores a plurality of items of protocol unique information to process communication signals corresponding to the plurality of processors; a communication controller which is connected to the plurality of processors via control buses with smaller transmission capacities than those of the plurality of communication lines, and reads the corresponding-protocol unique information from the memory based on notified protocol identification information and makes the corresponding processor execute signal processing by the protocol unique information; and a call controller which notifies protocol identification information corresponding to a communication line to be added to the communication controller, when a setting request for a call is issued; wherein the communication controller includes a communication control function for telephone terminals connected to a communication line with a minimum transmission capacity among the plurality of communication lines.

First Embodiment

Figure 1:
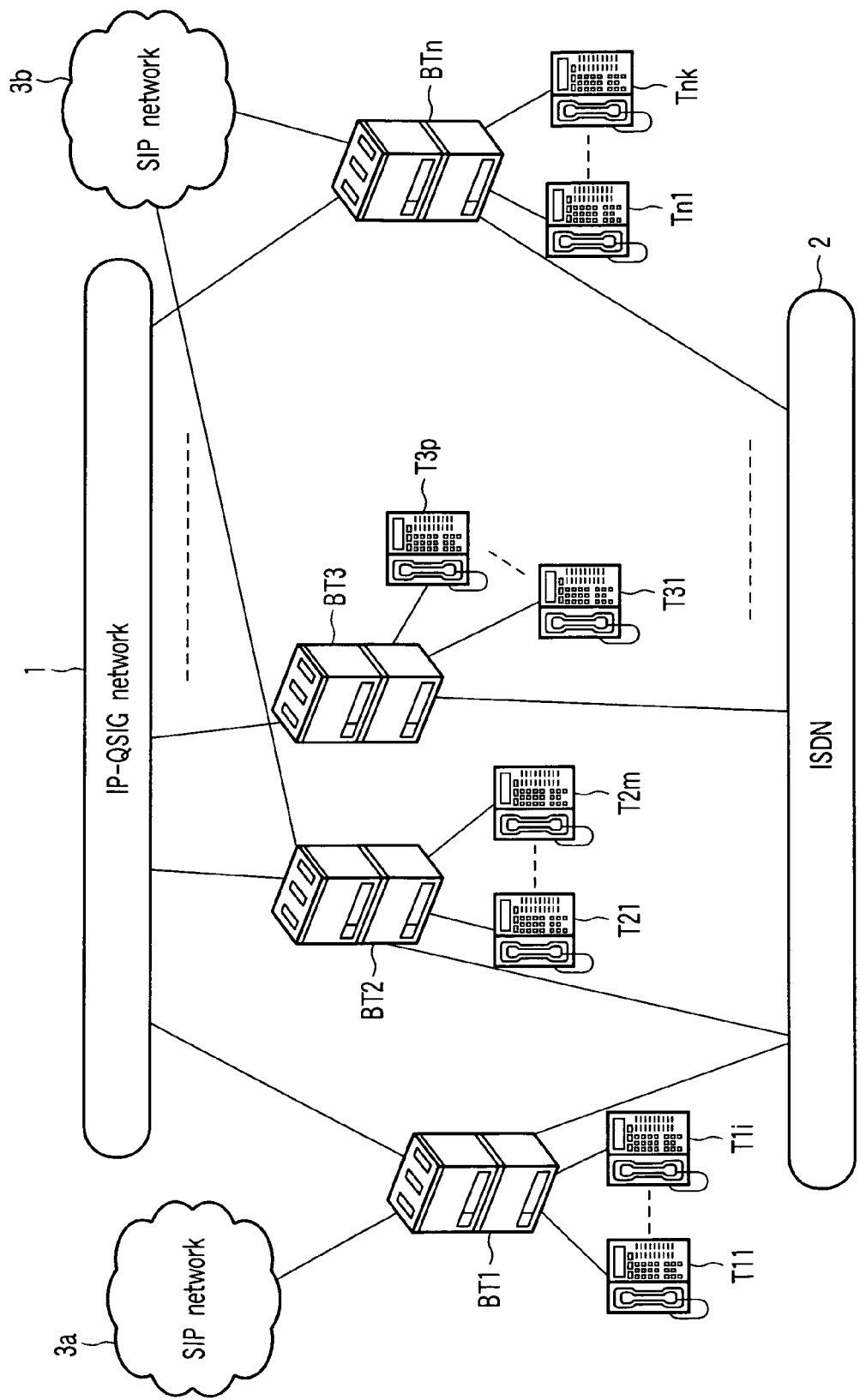
FIG. 1 is a schematic configuration view illustrating the first embodiment of a telephone system regarding the invention.

FIG. 1 is a schematic configuration view illustrating the first embodiment of the telephone system regarding the invention.

The telephone system includes an IP-QSIG network 1 as an exclusive line. A plurality of main apparatuses BT1-BTn (n is a natural number) are connected to the IP-QSIG network 1. Key telephone sets T11-T1$i$ ($i$ is a natural number), T21-T2$m$ ($m$ is a natural number), T31-T3$p$ ($p$ is a natural number), and Tn1-Tnk ($k$ is a natural number) are connected to the main apparatuses BT1-BTn, respectively. The main apparatuses BT1-BTn are connected to an ISDN 2. The main apparatuses BT1, BTn are connected to SIP networks 3$a$, 3$b$.

The main apparatuses BT1-BTn include ordinary exchange control functions regarding outgoing and incoming calls among the key telephone sets T11-T1$i$, T21-T2$m$, T31-T3$p$ and Tn1-Tnk, among the ISDN 2 and the key telephone sets T11-T1$i$, T21-T2$m$, T31-T3$p$, Tn1-Tnk, and among SIP networks 3$a$, 3$b$ and the key telephone sets T11-T1$i$, T21-T2$m$, T31-T3$p$, Tn1-Tnk.

FIG. 2 shows a function block diagram of each of the main apparatuses BT1-BTn. Here, the main apparatus BT1 will be described as a representative one.

The main apparatus BT1 includes a key telephone controller 11 (hereinafter referred to as a controller 11), an SIP communicator 12, an ISDN communicator 13, an IP-QSIG communicator 14, a Q.931 controller 15, a call controller 16, and a database 17. The controller 11, the SIP communicator 12, the ISDN communicator 13, the IP-QSIG communicator 14, the Q.931 controller 15, the call controller 16 and the database 17 are mutually connected through a control bus 18 having a smaller transmission capacity than those of the IP-QSIG network 1, the ISDN 2 and the SIP networks 3a, 3b. A plurality of items of protocol unique information to be used by the Q.931 controller 15 are stored in the database 17.

The controller 11 houses the plurality of key telephone sets T11-T1i. The controller 11 performs outgoing and incoming call processing and transfer processing of digital signals, etc. to and from the key telephone sets T11-T1i.

The SIP communicator 12 performs interface processing to and from the SIP network 3a under the control by the Q.931 controller 15.

The ISDN communicator 13 performs interface processing to and from the ISDN 2 under the control by the Q.931 controller 15.

The IP-QSIG communicator 14 performs interface processing to and from the IP-QSIG network 1 under the control by the Q.931 controller 15.

The Q.931 controller 15 reads the corresponding-protocol unique information from the database 17 based on protocol identification information notified from the call controller 16 and makes the corresponding-SIP communicator 12, ISDN communicator 13 and IP-QSIG communicator 14 execute interface processing based on the protocol unique information.

The call controller 16 includes a function of notifying the protocol identification information corresponding to a communication line to be added to the Q.931 controller in addition to ordinary control functions of outgoing call processing with call requests from each key telephone sets T11-T1i, usual incoming call processing and transfer processing among the key telephone sets T11-T1i.

The following will describe operations of a system configured as mentioned above.

FIG. 3 shows a sequence view depicting communication operations among the IP-QSIG network 1, the ISDN 2 and the SIP network 3a in response to outgoing call operations from the key telephone set T11.

(Outgoing Call to ISDN)

It is assumed that the key telephone set T11 housed in the main apparatus BT1 conducts an outgoing call operation to the ISDN 2. The main apparatus BT1 then determines a trunk type to add for an outgoing call from dial information input from the key telephone set T11 by means of the call controller 16, and notifies the trunk type to the Q.931 controller 15.

Figure 4:
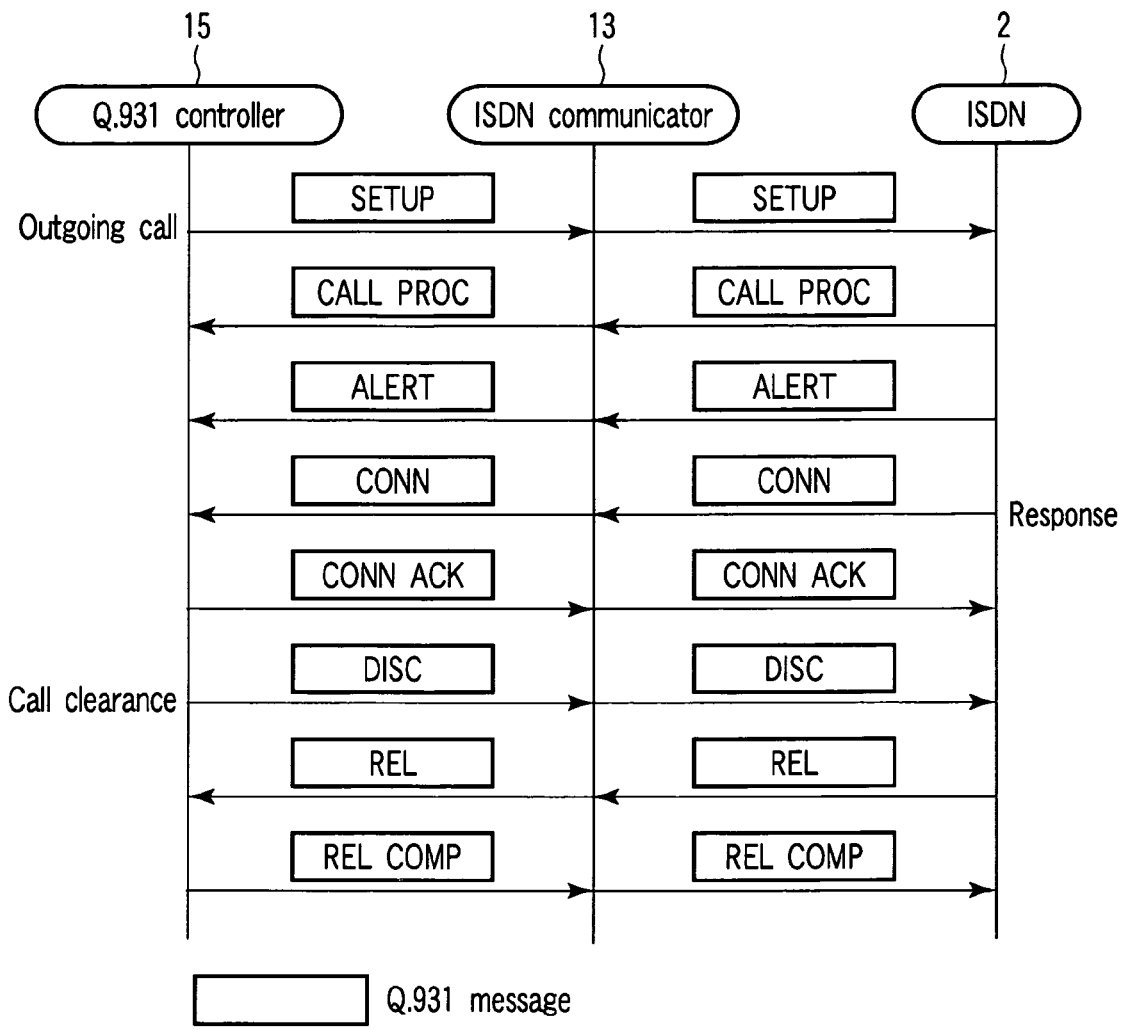
FIG. 4 is a sequence view illustrating communication operations among a Q.931 controller, an ISDN communicator and the ISDN in making an outgoing call to the ISDN.

The Q.931 controller 15 determines that the incoming call destination is the ISDN 2 based on the trunk type notified from the call controller 16 to generate 'SETUP' message as communication establish request, as shown in FIG. 4. The Q.931 controller 15 transmits the 'SETUP' message to the ISDN communicator 13.

The ISDN communicator 13 which has received a 'SETUP' message transmits the 'SETUP' message to the ISDN 2.

When receiving a message 'CALL PROC, ALERT' from the side of the ISDN 2, the ISDN communicator 13 notifies an event of a message reception to the Q.931 controller 15.

In contrast, when a response is made by a communication partner for the notification of the incoming call, the ISDN 2 transmits a response message 'CONN' to the main apparatus BT1. Thus, a communication link is formed between the key telephone set T11 that is an outgoing call origin, after this, communication is enabled.

When a call clearing operation is performed by the key telephone set T11, the main apparatus BT1 transmits a disconnection request message 'DISC' to the ISDN 2, when the incoming call destination receives the disconnection request message, a response message 'REL' is returned, and after this, the communication link to and from the incoming call destination is disconnected.

(Outgoing Call to IP-QSIG Network)

It is assumed that the key telephone set T11 housed in the main apparatus BT1 has performed the outgoing call operation to the key telephone set T21 to be housed in the main apparatus BT2. In the main apparatus BT1, the call controller 16 determines the type of the trunk to add in making an outgoing call from dial information input from the key telephone set T11 to notify the type to the Q.931 controller 15.

The Q.931 controller 15 determines that the incoming call destination is the key telephone set T21 based on the trunk type notified from the call controller 16 to acquire protocol unique extension information from the database 17. For instance, if the trunk type is one of the IP-QSIG networks 1, the extension information is equivalent to a destination IP address and a port number.

Figure 5:
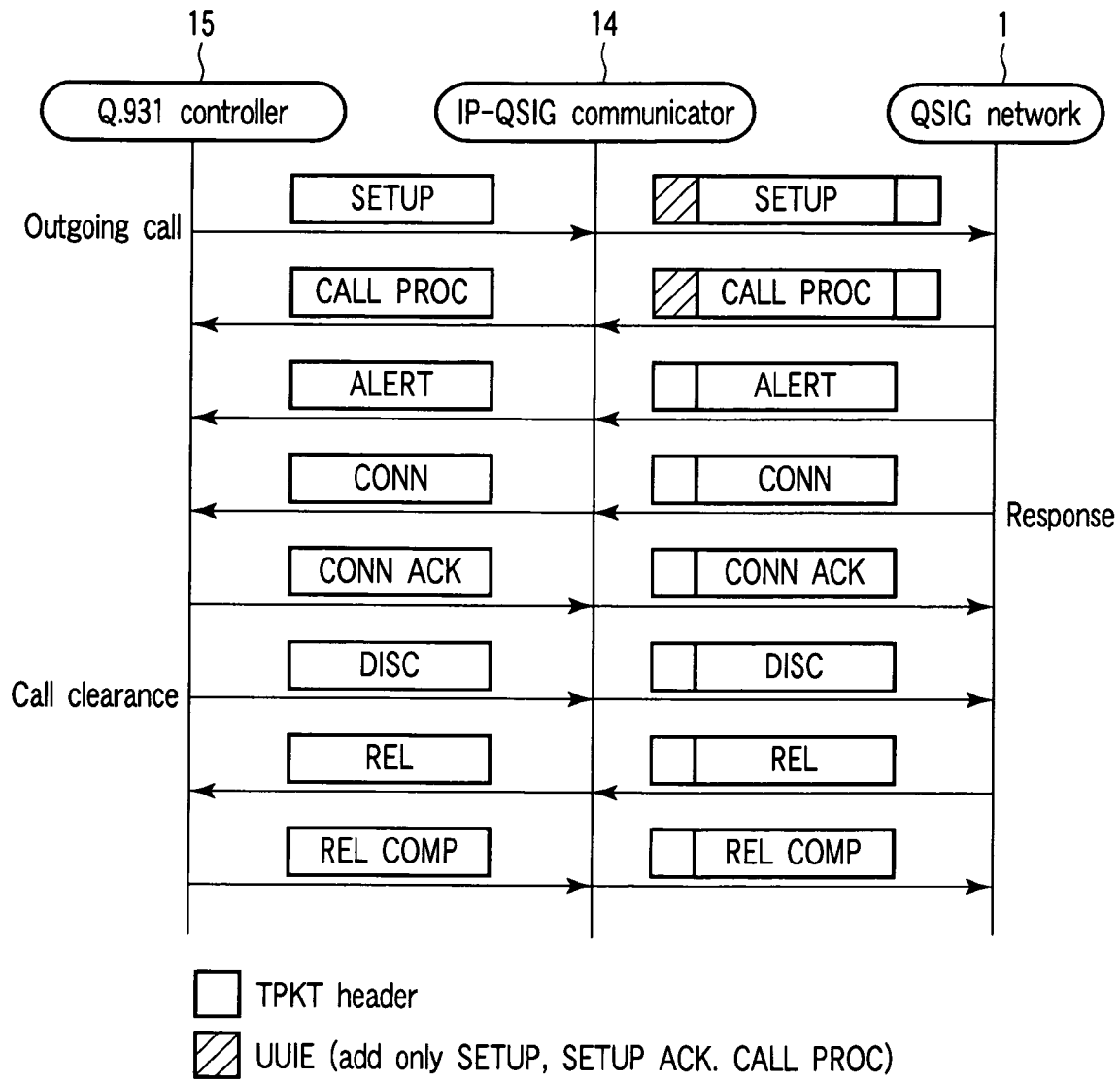
FIG. 5 is a sequence view illustrating communication operations among the Q.931 controller, an IP-QSIG communicator and the IP-QSIG network in making an outgoing call to the IP-QSIG network in the first embodiment.

The Q.931 controller 15 generates the 'SETUP' message to be always transmitted in making outgoing calls, and transmits a message to the IP-QSIG communicator 14 together with the extension information acquired from the database 17, as shown in FIG. 5. For instance in the case of the IP-QSIG network 1, the Q.931 controller 15 each transmits the 'SETUP' message+destination IP address and the destination port number.

The main apparatus BT2 which has received the 'SETUP' message and the protocol unique extension information transmits a message to the line in a form in which necessary extension information is added to the foregoing message for the connected line. For instance, in the case of the IP-QSIG, the IP-QSIG communicator 14 adds the QSIG unique additional information to the header and the end of the 'SETUP' message to transmit the 'SETUP' message.

In receiving the message 'CALL PROC, ALERT' from the side of the IP-QSIG network 1, the IP-QSIG communicator 14 notifies the event of message reception to the Q.931 controller 15.

The main apparatus BT2 transmits an incoming call signal to the key telephone set T21. The key telephone set T21 which has received the incoming call signal generates a ring tone or displays the incoming call, thereby the user is notified the arrival of the incoming call. When the user performs a response operation to the incoming call notification, the key telephone set T21 transmits a response signal to the main apparatus BT2, and the main apparatus BT2 which has received the response signal adds a TPKT header to a response message 'CONN' and transmits the response message 'CONN' to the IP-QSIG network 1. After this, the IP-QSIG network 1 transmits the response message 'CONN' to the main apparatus BT1. Thus, a communication link is formed between the key telephone set T11 that is the outgoing call origin and the key telephone set T21 that is the incoming call destination, and after this, communication is enabled.

When the key telephone set T11 performs the call clearing operation, the main apparatus BT1 transmits a disconnection request message 'DISC' to the IP-QSIG network 1, when the key telephone set T21 at the incoming call destination receives the disconnection request message, a response message 'REL' is returned, and after this, the communication link is disconnected to and from the incoming call destination.

(Outgoing Call to SIP Network)

It is assumed that the key telephone set T11 housed in the main apparatus BT1 performs an outgoing call operation to the SIP network 3a. In the main apparatus BT1, the call controller 16 determines the trunk type to be added in making outgoing call from the dial information input from the key telephone set T11 to notify the type to the Q.931 controller 15.

The Q.931 controller 15 determines that the incoming call destination is the SIP network 3a, and acquires the protocol unique extension information from the database 17 based on the trunk type notified from the call controller 16. For instance, if the trunk type is the SIP, the extension information is equivalent to the SIP URI of the partner's destination, the IP address and report number of a proxy server.

The Q.931 controller 15 generates the 'SETUP' message to always transmit in making outgoing call, and transmits a message to the SIP communicator 12 together with the protocol unique extension information acquired from the database 17, as shown in FIG. 6. In the case of SIP, the Q.931 controller 15 each transmits the 'SETUP' message+partner's destination SIP URI, proxy server information, etc.

The incoming call side which has received the 'SETUP' message and the protocol unique extension information transmits a message to the connected line in the form in which the necessary extension information is added to the message. In the case of SIP, the SIP communicator 12 converts the 'SETUP' message into a message for the SIP which is compliant with RFC3261 to each transmit the converted message.

In receiving a message '100 Trying, 180 Ringing' from the side of the SIP network 3a, the SIP communicator 12 converts the message into a message for ISDN to notify an event of message reception to the Q.931 controller 15.

On the other hand, when the communication partner's destination makes a response for the incoming call notification, the side of the SIP network 3a transmits a response message '200 OK' to the main apparatus BT1. Thus, the communication link is formed between the key telephone set T11 that is the outgoing call origin and the terminal at the incoming call destination, and after this, the communication is enabled.

When the key telephone set T11 performs the call clearing operation, the main apparatus BT1 transmits a disconnection request message 'BYE' to the SIP network 3a, when the incoming call destination receives the disconnection request message, the response message '200 OK' is retuned, and after this, the communication link to and from the incoming call destination is disconnected.

As mentioned above, in the first embodiment, each main apparatuses BT1-BTn includes the SIP communicator 12, the ISDN communicator 13, and the IP-QSIG communicator 14, and also includes only the Q.931 controller 15 corresponding to the ISDN 2 which has the smallest transmission capacity among the SIP networks 3a, 3b, the ISDN 2 and the IP-QSIG network 1 to share the Q.931 controller 15 with each of the SIP communicators 12, the ISDN communicators 13, and the IP-QSIC communicators 14, notifies the IP protocol unique identification information to the Q.931 controller 15 necessary for ISDN call control, and then, the Q.931 itself absorbs a protocol difference.

Accordingly, since there is no need for each main apparatus BT1-BTn to install an exclusive controller corresponding to each of the SIP communicators 12 and the IP-QSIG communicator 14, and the SIP communicator 12 and the IP-QSIG communicators 14 shares the Q.931 controller 15, the first embodiment may provide a telephone system with relatively small size and a low const. The system may easily provide the existing service which has been provided through the ISDN 2 to the protocols differing from one another.

Second Embodiment

Figure 7:
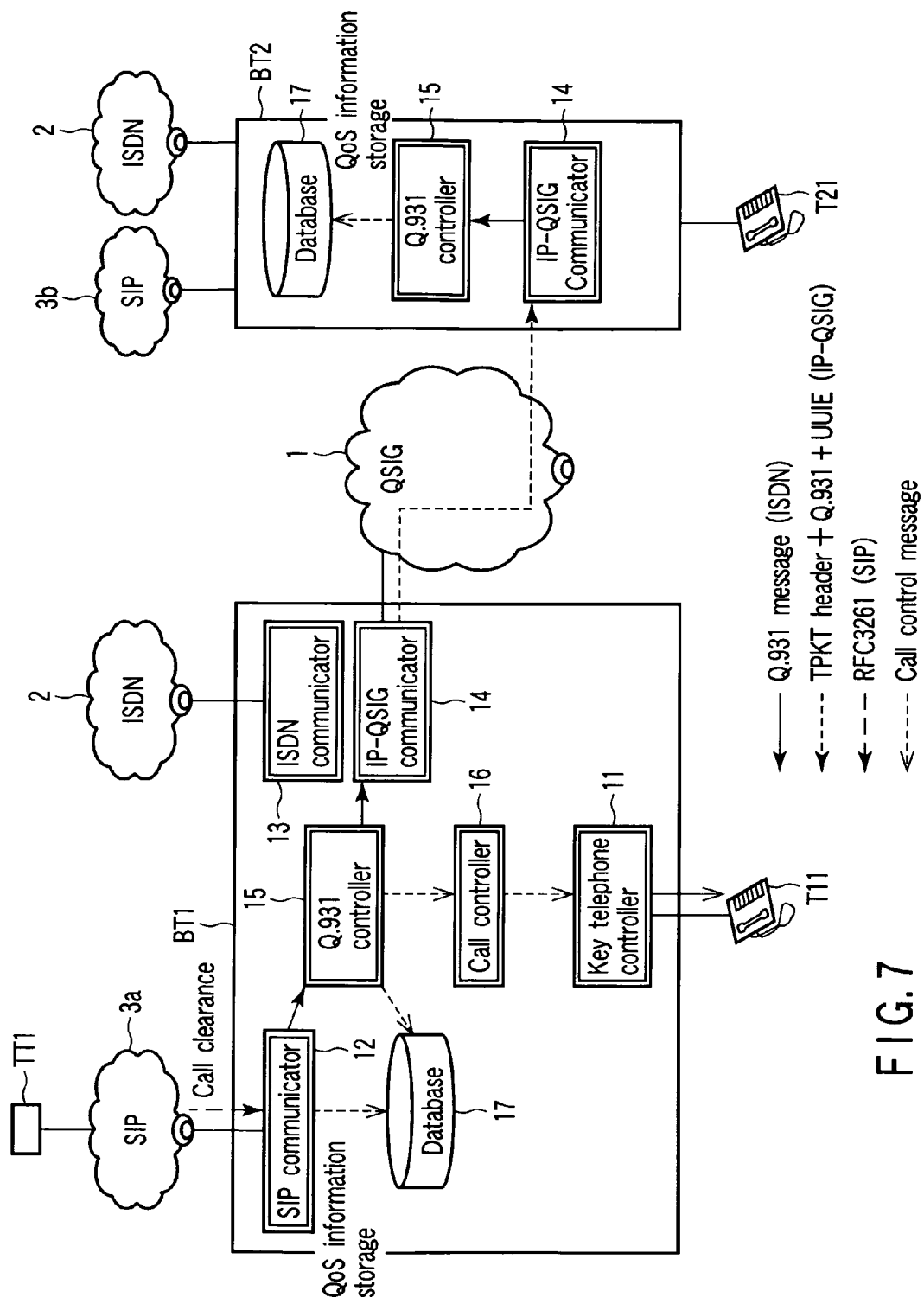
FIG. 7 is a sequence view illustrating for explaining communication operations among main apparatuses for periodically communicating QoS (Quality of Service) information as the second embodiment of the invention.

FIG. 7 shows a sequence view for explaining communication operations between the main apparatus BT1 which periodically communicates QoS information and the main apparatus BT2 as the second embodiment. In FIG. 7, the same components as those of FIG. 3 are designated by the identical symbols and the detailed description thereof will be omitted.

For instance, it is assumed that communication is made between the key telephone set T11 housed in the main apparatus BT1 and an external TT1 on the SIP network 3a, as shown in FIG. 7.

In this state, when a calling is released, the SIP communicator 12 stores QoS information of the corresponding-calling as needed, and transmits a disconnection system message to the Q.931 controller 15. Jitter, delay, packet loss, the number of real-time transport protocol (RTP) transmission reception packets, etc. are stored as the QoS information.

The Q.931 controller 15 which has received the disconnection system message from the SIP communicator 12 acquires the QoS information from the database 17, sets the QoS information to a User-User information element, and generates an 'INFO' message to transmit the 'INFO' message to the IP-QSIG communicator 14.

The IP-QSIG communicator 14 which has received the 'INFO' message from the Q.931 controller 15 transmits the 'INFO' massage to all the main apparatuses BT2-BTn belonging to the same networking system (FIG. 7 shows an example of a networking system by two nodes).

When receiving the 'INFO' message, the IP-QSIG communicator 14 on the main apparatus BT2 side requires decoding the 'INFO' message to the Q.931 controller 15.

The Q.931 controller 15 which has received the decode request of the 'INFO' message from the IP-QSIG communicator 14 stores the QoS information, from the main apparatus BT1, which has been set in the User-User information element of the 'INFO' message, in the database 17 in its own node.

Similarly, the QoS information relating to IP trunk communication stored in the main apparatus BT2 side is also transmitted to each node through the IP-QSIG communicator 14 when the call is released to be stored in the database 17 in the reception side node.

As mentioned above, according to the second embodiment, by periodically communicating the QoS information relating to the IP trunk communication among each of the main apparatuses BT1-BTn via the IP-QSIG network 1, the telephone system may integrally manage the QoS information about the IP trunk communication of all the main apparatuses BT1-BTn in the same networking system by each main apparatus BT1-BTn.

Third Embodiment

Figure 8:
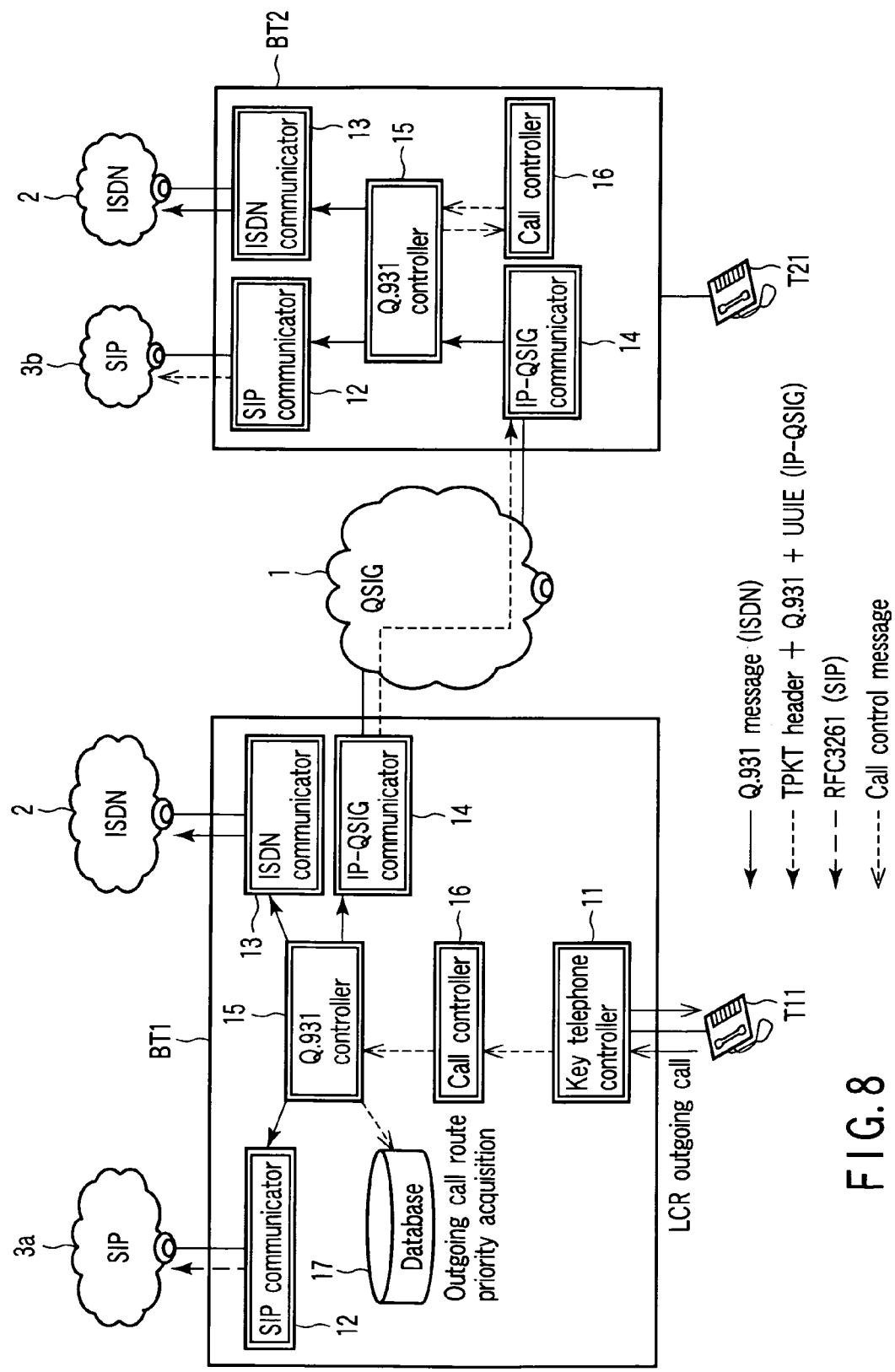
FIG. 8 is a sequence view illustrating for explaining communication operations among main apparatuses for selecting an outgoing call route based on the QoS information as the third embodiment.

FIG. 8 shows a sequence for explaining communication operations between the main apparatus BT1 and the main apparatus BT2 which select the outgoing call routes based on the QoS information as the third embodiment of the invention.

When the key telephone set T11 housed in the main apparatus BT1 makes a 'low cost rout (LCR)' outgoing call, the call controller 16 acquires all trunk numbers capable of being added in order of priority from outgoing call selection table data which is preset in the database 17, based on the dial information input from the key telephone set T11. If an IP trunk (e.g., SIP network 3a) exists in a trunk capable of being added, the call controller 16 simultaneously acquires the latest QoS information which has been set for each call in the second embodiment, and notifies all items of information acquired from the database 17 to the Q.931 controller 15.

The Q.931 controller 15 selects an optimum outgoing call route based on the outgoing call route information notified from the call controller 16 and the QoS information relating to the IP trunk. To reduce a communication cost, a case is assumed, which the outgoing call route bypassing to the ISDN 2 in the case in which the IP trunk is usually set as a top priority for the outgoing call, any failure occurs in the IP trunk and all voice channels are busy. However, in the case of the IP trunk, there is a case in which the voice quality is extremely dropped due to the congestion of the network; the Q.931 controller 15 may make the outgoing calls by using not only function setting data but also the latest QoS information in selecting outgoing call route to use the IP trunk via other node and by using the ISDN communicator 13 in its own node unconditionally.

As given above, on the third embodiment, each main apparatus BT1-BTn not only may select the outgoing call routes in accordance with the priorities preset in making the outgoing call of LCR but also may select the final outgoing call routes by also referring to the QoS information measured in generating calls at the time of the selection of the outgoing call routes in regard to the IP trunk which is frequently set as a route with a high priority.

Thus, in comparison with the conventional system in which communication routes with short distances and with low communication costs have been frequently selected, the telephone system may select routes in making the LCR outgoing calls by taking not only the communication cost but also voice quality into account.

Other Embodiment

This invention is not limited to each of the forgoing embodiments. For instance, while each embodiment has described by way of example of selecting the outgoing call route by using the QoS information, the telephone system may notify outside the QoS information to be communicated as an alarm.

While each of the foregoing embodiments has described the SIP network, ISDN and IP-QSIG network as the example, a communication line which requires a new communication protocol other than the SIP network, ISDN and IP-QSIG network may be connected with the main apparatus. In this case, a controller of a communication protocol corresponding to a minimum transmission capacity is disposed in the main apparatus.

While the second and the third embodiments have described the example in which the Q.931 controllers execute the communication control for the QoS information and the selection control of the outgoing calls based on the QoS information, the call controllers etc. may execute such control.

Other than this, types of the telephone systems, the functional configurations of the main apparatuses, types of the telephone terminals to be housed in the main apparatuses, kinds of the communication protocols, communication control of the QoS information, each procedure and its content of the selection control of the outgoing call routes, etc. may be embodied in various forms without departing from the spirit or scope of the general inventive concept thereof.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A telephone exchange apparatus comprising:
   a plurality of processors whose connect communication lines differing in communication protocol from one another;
   a memory which stores a plurality of items of protocol unique information to process communication signals corresponding to the plurality of processors;
   a communication controller which is connected to the plurality of processors via control buses with smaller transmission capacities than those of the plurality of communication lines, and reads the corresponding-protocol unique information from the memory based on notified protocol identification information and makes the corresponding processor execute signal processing by the protocol unique information; and
   a call controller which notifies protocol identification information corresponding to a communication line to be added to the communication controller, when a setting request for a call is issued;
   wherein the communication controller includes a communication control function for telephone terminals connected to a communication line with a minimum transmission capacity among the plurality of communication lines wherein:
   when a session initiation protocol network is used as the communication lines, and an Internet Protocol-Q-Signaling network is used as a private network, the system further comprises:
   a communicator which periodically communicates voice quality information relating to Internet Protocol trunk communication using the session initiation protocol network among the plurality of telephone exchange apparatuses; and
   a route selector which selects one communication route among a plurality of communication routes which are formed between a first telephone terminal to be connected to a telephone exchange apparatus to be a trunk outgoing call side and a second telephone terminal to be an incoming call destination and pass through different communication lines, private network or telephone exchange apparatuses, based on a communication result of the voice quality information by the communicator in making a trunk outgoing call.

2. The telephone exchange apparatus according to claim 1, wherein:
   when the session initiation protocol network, an integrated service digital network, and the Internet Protocol-Q-Signaling network are used as the plurality of communication lines,
   the communication controller is a Q.931 controller by the ISDN.

3. A telephone system in which a plurality of telephone exchange apparatuses, configured to be connected with a plurality of telephone terminals or a plurality of communication lines differing in communication protocol from one another, are mutually connected by a private network, wherein each of the plurality of telephone exchange apparatuses comprises:

a plurality of processors whose connect the communication lines;

a memory which stores a plurality of items of protocol unique information to process communication signals corresponding to the plurality of processors;

a communication controller which is connected to the plurality of processors via control buses with smaller transmission capacities than those of the plurality of communication lines, and reads the corresponding-protocol unique information from the memory based on notified protocol identification information and makes the corresponding processor execute signal processing by the protocol unique information; and a call controller which notifies protocol identification information corresponding to a communication line to be added to the communication controller, when a setting request for a call is issued;

wherein the communication controller includes a communication control function for telephone terminals connected to a communication line with a minimum transmission capacity among the plurality of communication lines wherein:

when a session initiation protocol network is used as the communication lines, and an Internet Protocol-Q-Signaling network is used as the private network, the system further comprises:

a communicator which periodically communicates voice quality information relating to Internet Protocol trunk communication using the session initiation protocol network among the plurality of telephone exchange apparatuses; and a route selector which selects one communication route among a plurality of communication routes which are formed between a first telephone terminal to be connected to a telephone exchange apparatus to be a trunk outgoing call side and a second telephone terminal to be an incoming call destination and pass through different communication lines, private network or telephone exchange apparatuses, based on a communication result of the voice quality information by the communicator in making a trunk outgoing call.

4. The telephone system according to claim 3, wherein:

when the session initiation protocol network and the integrated signal digital network are used as the plurality of communication lines, and an Internet Protocol-Q-Signaling network is used as the private network, the communication controller is Q.931 controller by the ISDN.

5. The telephone system according to claim 3, further comprising:

a notifying unit to notify outside the voice quality information notified from the communicator.

\* \* \* \* \*